July 5, 1927.

S. J. BENS

LINK FOR CHAINS OR BELTS

Original Filed Feb. 7, 1924

1,634,644

Inventor:
Samuel J. Bens,
by Spear, Middleton, Donaldson & Hall
Attys.

Patented July 5, 1927.

1,634,644

UNITED STATES PATENT OFFICE.

SAMUEL J. BENS, OF NEW YORK, N. Y.

LINK FOR CHAINS OR BELTS.

Application filed February 7, 1924, Serial No. 691,251. Renewed November 16, 1926.

This invention is concerned with a chain or link belt wherein the individual links comprising the chain or belt are so constructed as to prevent lateral movement therebetween, and also to make that part of the belt or chain between pulleys as nearly similar to a rigid bar as possible.

This invention is particularly adaptable to be used in connection with chain saws. It has been my experience with such devices that there is a tendency, when the saw blade is being driven through a tree, log, or the like, for movement between links in a lateral direction. This results in an uneven, jagged cut, and sometimes even breaking teeth.

I have also encountered difficulty in the use of such chain saws by reason of the fact that the weight of the chain itself, as suspended between pulleys, or even between a pulley and the point where the blade leaves or enters the tree kerf, has a tendency to sag. This sag, together with the pull from the power driven pulley, often causes the links to break off, which not only is expensive because of necessary replacement, but is extremely undesirable through loss of time, danger to the operators, and general lowering of the efficiency of the entire device. The invention, therefore, provides means whereby the above difficulties are lessened to a great degree.

To this end my invention includes a chain or belt comprised of individual links, each one of which consists of a plate having apertures to one side of the main body of the link, these apertures being in substantial line with the direction of pull of power. Projections are provided on the individual links adjacent the apertures, which are adapted to engage, or that portion of the link between projections is adapted to engage. the means for applying power, such as a sprocket or the like. Adjacent links are adapted to have their ends over-lap and a rivet passed through the registering apertures to secure the two links together in a manner which will allow partial rotation thereof about said pivot. Adjacent links over-lap only at that point adjacent to the pivot between said links, but I have found it desirable to have the abutting edges of adjacent links in line with the center of the pivot between links. Also, my making these abutting edges beveled or inclined reversely to each other, it will be apparent that lateral movement between links is prevented, as each link is supported throughout its entire edge on the edge of the link adjacent thereto.

The invention also consists in the particular construction and arrangement of parts herein shown and described.

I have illustrated a preferred embodiment of my invention in the accompanying drawings, but it is to be understood that I do not wish to be limited thereto, as the illustration merely exemplifies one manner of carrying out the invention.

In these drawings:—

Figure 2:
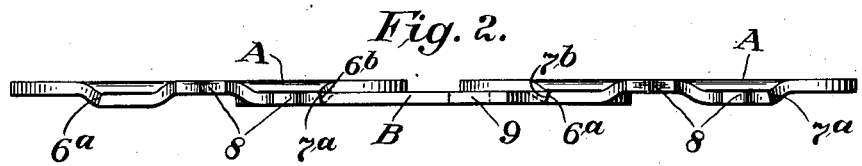
Fig. 2 is an edge elevation.

In the preferred form illustrated I have shown the invention as applied to the individual links in a chain saw, in which the link A consists of a main body 1 having apertures 2 and 3 to one side of the main body, and projections 4 and 5 in proximity to the apertures 2 and 3, which give the edge of the link A a contour adapted to conform to the sprocket over which the chain is to pass. This sprocket is not illustrated as it forms no part of this invention and may be of any suitable form.

The main body 1 is so constructed that its extreme edges $6^a$ and $7^{a\cdot}$ are approximately in line with the centers of the apertures 2 and 3 respectively. These edges $6^a$ and $7^a$ are under-cut, beveled, or inclined, as is clearly shown, and for a purpose which will be more fully described hereinafter. That part of the main body 1 opposite the projections 4 and 5 is provided with cutting teeth 8 of the usual type.

A second link B is provided, similar to the link A, with the exception that the cutting teeth 8 have been replaced with a clearing tooth 9 which serves to clear the sawdust from the kerf in order to prevent this cut from clogging, and to make the following cutting teeth more effective. It will be noted, however, that the main body 1 of link B, is provided with edges $6^b$ and $7^b$ inclined or beveled in the reverse direction to the edges $6^a$ and $7^a$ of link A. Thus when the apertures in links A and B are made to reverse by placing the link B upon the link A, the edge $7^a$ will rest upon and be supported by the edge $6^b$. Thus relative movement between links A and B in either lateral direction is prevented by reason of the fact that at one portion of the contact between these two links, the link B is supported upon the link A, as at that part of the links surrounding the aligning apertures and at the remainder of their contact the link A is supported upon the link B, as at where contact is made between the edges of their main bodies.

It will be apparent that any number of these two types of links, as A and B, may be used to produce a chain or belt of any desired length. It may even be found desirable to incorporate links A and B into one link, doing away with the pivot therebetween, as this will be a very obvious construction.

I have found when such links are used with chain saws, that any tendency to sag is entirely obviated by reason of the fact that the entire line of support between links is in line with the center of the pivot between links, which not only makes that part of the chain saw supported between pulleys, or between pulley and kerf, as a rigid bar, but prevents breakage of the links due to this cause.

In the claim wherein I refer to the edges of the main body of the links, it is understood that the edges such as 6ª, 7ª, 6ᵇ and 7ᵇ are meant.

Heretofore, I may add, I have found with former constructions there was a great strain, particularly in starting, on the link sections where the pivots were arranged out of line with the joints between links, and where the extending teeth or extending portions of the saw were simply adjacent or in contact with each other without interlocking or sustaining relation, the result being, as the saw was started, a whip-like action followed which placed such a strain on the saw that the links would break as the saw lifted from its sagging position when at rest. The present construction overcomes this very serious difficulty in that the arrangement is such that the moment the saw is started, the abutting beveled edges come into contact and stiffen the saw throughout so as to interrupt or prevent the whip-like action and the rupture incident thereto, the strain being also lessened upon the links, due to the fact that the abutting edges of adjacent links are in line with the center of the pivots between links.

Figure 1:
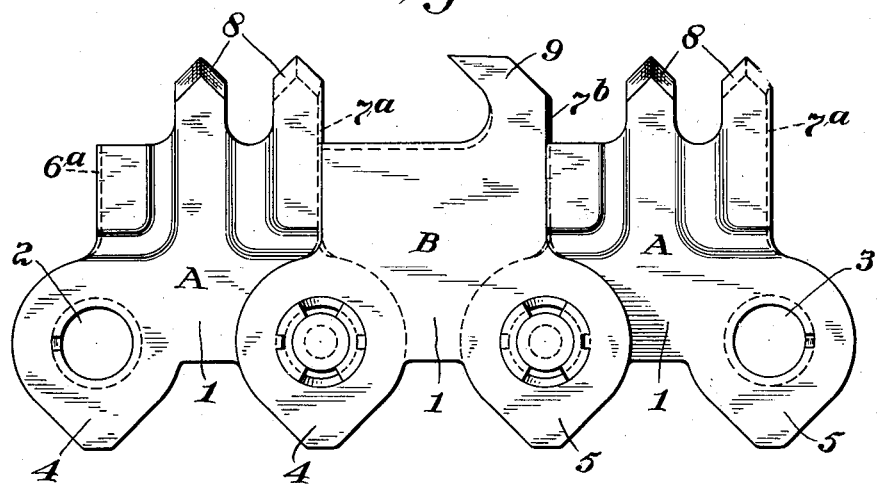
Figure 1 is a plan view of one embodiment of my invention.
Figure 3:
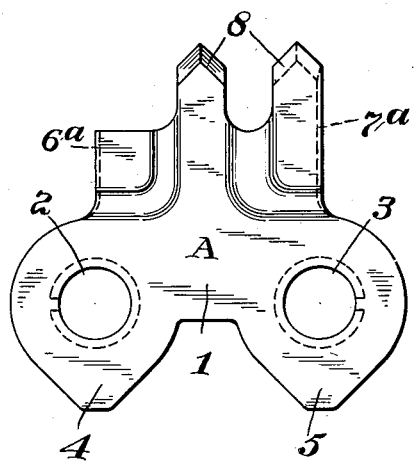
Figs. 3, 4 and 5 are details of the link element.
Figure 4:
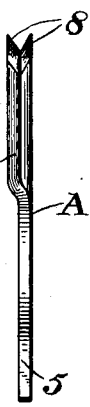
Figure 5:
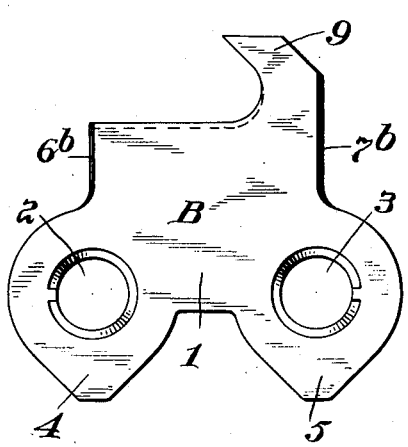

In the claim where I refer to the word "top" of a link, I mean the broad upper surface of the link, as shown in Fig. 1, the opposite side being the bottom.

Having thus described my invention, what I claim is:—

1. A chain or belt including individual links, adjacent links having their ends overlapped and secured together in a pivotal manner, each link having opposite edges reversely beveled, a line on top of each link joining the beginning of the bevel being of a different length than a similar line on the link bottom.

2. A chain or belt including individual links, adjacent links having their ends overlapped, means securing the overlapped ends together in a pivotal manner, the edges of adjacent links contacting with each other, said edges being beveled, opposite edges of each link being reversely beveled.

3. A chain or belt including individual links, adjacent links having their ends overlapped, means for securing the overlapped ends together in a pivotal manner, the edges of adjacent links being in contact with each other and overlapping each other in a manner in reverse relation to the overlapped ends.

4. A chain saw including individual links, adjacent links having overlapped portions, means to secure said portions together in a pivotal manner, and means for wedging each link toward the lapping portion of its neighbor on each side, in a direction parallel to the axis of the pivot means.

5. A chain or link belt including links, each link overlapping its neighbor and pivoted thereto, each link having two single beveled edges, each alternate link having its entire beveled edges lying between the beveled edges and the overlapping parts of its neighbor on each side.

In testimony whereof, I affix my signature.

SAMUEL J. BENS.